April 30, 1963    P. J. WEAVER    3,087,636
MACHINE CONTROL
Filed Oct. 10, 1960    3 Sheets-Sheet 2
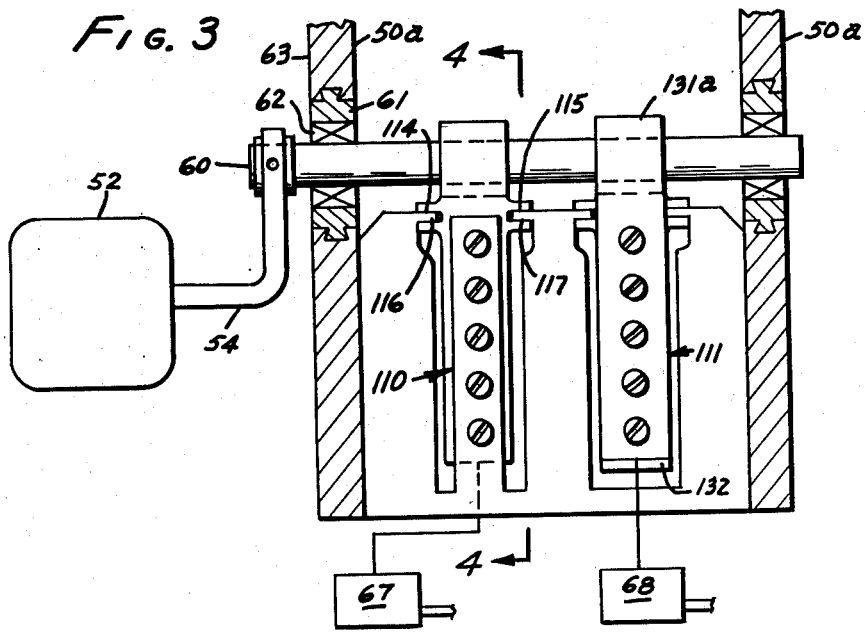
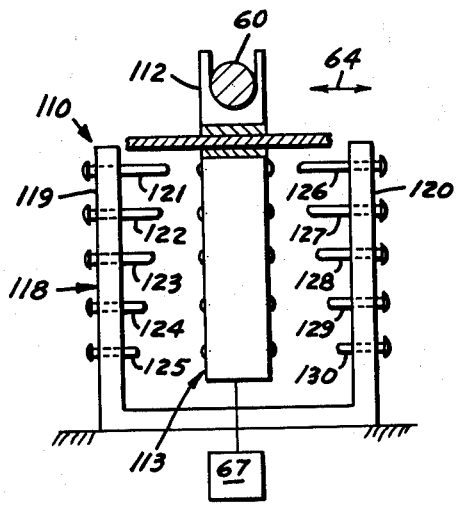
INVENTOR.
PAUL J. WEAVER
BY Angus & Mon
ATTORNEYS.

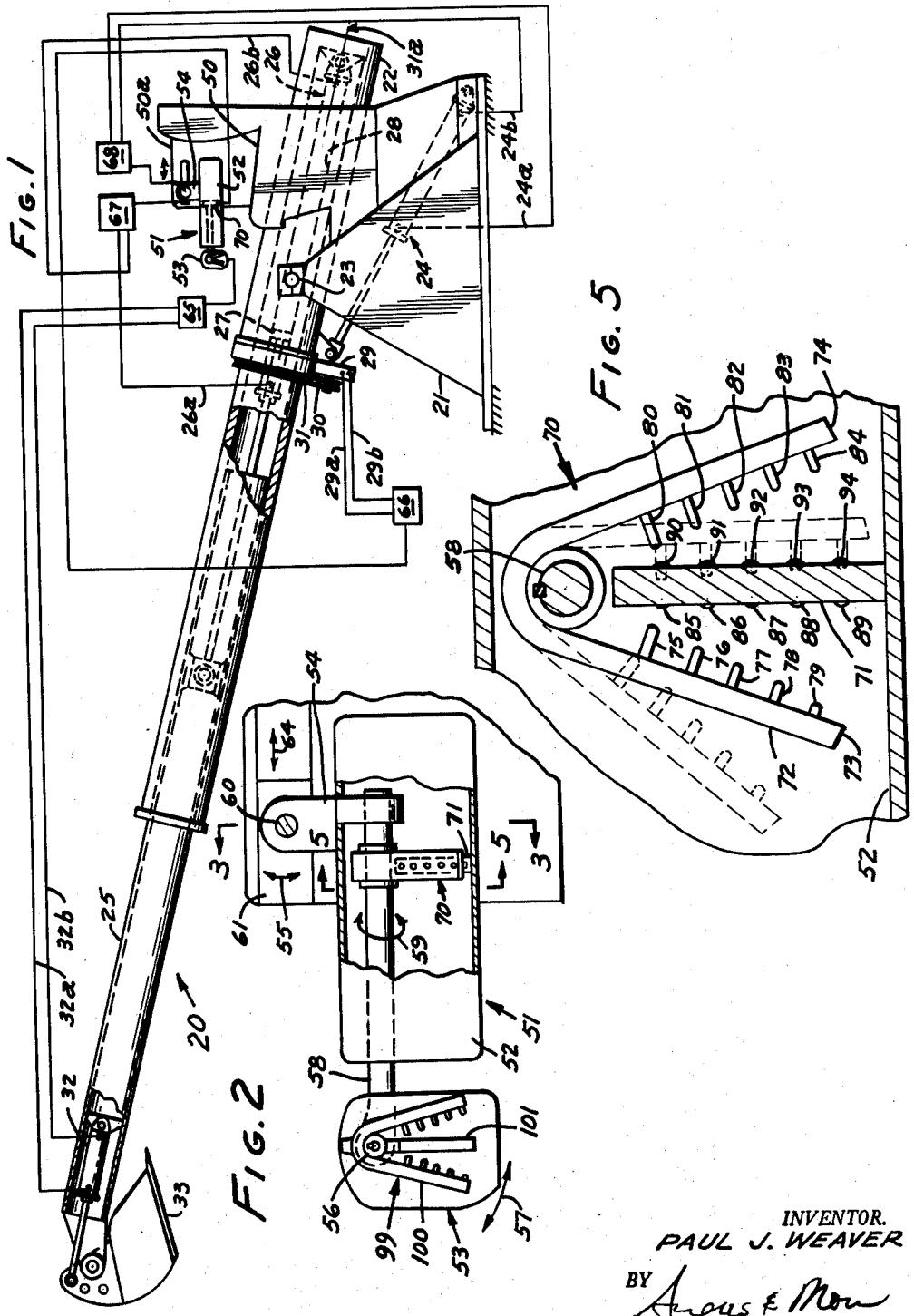

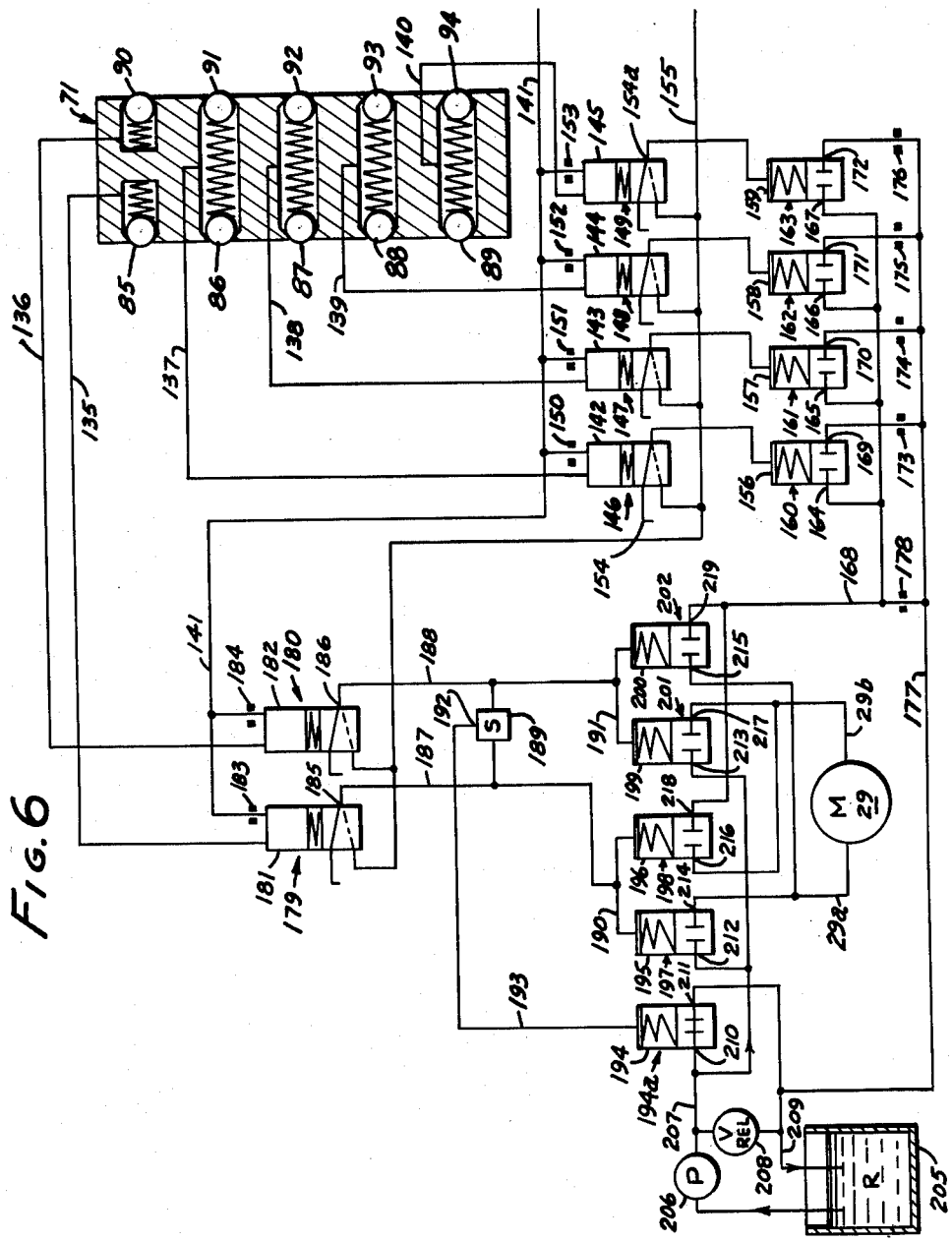

United States Patent Office 3,087,636
Patented Apr. 30, 1963

3,087,636
MACHINE CONTROL
Paul J. Weaver, Pasadena, Calif., assignor to True-Trace Corporation, El Monte, Calif., a corporation of Connecticut
Filed Oct. 10, 1960, Ser. No. 61,540
8 Claims. (Cl. 214—141)

This invention relates to a control for regulating the operation of a machine along a plurality of machine axes, and in particular to an analogue-type control whereby movements of the operator's arm are substantially duplicated in the machine being controlled.

An object of this invention is to provided an analogue-type control mechanism for an excavating shovel wherein the control may be adapted to a man's hand and arm such that the operator will have the sensation that his hand and the shovel are in directly linked operative connection.

An additional object of this invention is to provide a control module for controlling movements along a machine axis which is simple to manufacture, use, and service.

This invention is carried out in combination with a machine having an element such as a shovel, scraper, or scoop whose movement is to be controlled along a plurality of axes, the movement along each axis being powered by a motor. The control for each motor includes a pneumatic system responsive to bleed ports that are actuated by a device manipulated by the operator. The resulting connection of the pneumatic system appropriately sets directional control elements for determining the direction in which power is applied. Progressively actuated trip mechanisms form part of the device and control the motor speed.

According to a preferred but optional feature of this invention, a control arm is provided for the operator, which control arm is movable along all axes of control, each axis of movement being provided with one of said devices for selecting the direction and rate of operation of the motor which moves the machine in that direction.

The above and other features of this invention will be fully understood from the following detailed description and the accompanying drawings, in which:

FIG. 1 is a side elevation of a shovel carrying a control according to the invention;

FIG. 2 is a fragmentary elevation, partly in cutaway cross-section, showing a portion of the control;

FIG. 3 is a cross-section taken at line 3—3 of FIG. 2;

FIG. 4 is a cross-section taken at line 4—4 of FIG. 3;

FIG. 5 is a cross-section taken at line 5—5 of FIG. 2; and

FIG. 6 is a circuit diagram of a unit of the control.

An example of a device on which a control according to the invention can be utilized is shown in FIG. 1. The illustrated device is a shovel 20 which can be mounted on a base such as a crawler or the like (not shown). A trunnion 21 is mounted on said base. The device includes a barrel 22 which is mounted to the trunnion by bearings 23, these bearings defining an axis of movement (elevation). A hydraulic motor 24 comprising a piston-cylinder device having supply conduits 24a, 24b is mounted to structure connected to the trunnion at one of its ends. The other of its ends is pin-mounted to the barrel so that extension or retraction of the rod of motor 24 caused by flow of pressurized fluid through conduits 24a, 42b causes the barrel to tilt in elevation.

Within the barrel, there is an extensible boom 25. This boom carries a hydraulic motor 26 which comprises a piston 27 on the boom reciprocable in the barrel which forms a surrounding cylinder 28. Conduits 26a, 26b provide means for supplying pressurized fluid to one side or the other of the piston to extend or retract the boom. The axis of extension of the boom comprises another axis of movement, that is, an in-out (extension-retract) movement of the boom.

A hydraulic motor 29 having conduits 29a, 29b for supply of pressurized fluid to one side or the other of the motor is attached to the barrel and carries a sprocket 30 engaged to a chain 31, the chain being attached at its ends to the extensible boom. Operation of motor 29 turns the sprocket to rotate the boom in the barrel, providing for a third axis of movement, that is, rotation of the boom around its own central axis 31a.

At the end of the boom there is a fourth hydraulic motor 32 (a piston-cylinder assembly) which has one of its ends fixed to the end of the boom, and the end of its rod fixed to a shovel 33 which is pivotally mounted to the end of the boom. Conduits 32a, 32b provide for supply of pressurized fluid to one side or the other of the motor to power its movements. Operation of the motor to extend and retract its rod tilts the bucket around a fourth axis of movement, that is, around the axis on which the shovel is pivoted.

The term "axis of movement" as used herein refers to rotational movement around centers of rotation or to axial shift along axes of movements of elements, and is not restricted to merely linear movement along cartesian coordinate-type axes. Also, there can be more than one "axis of movement" about and along a single line; for example, there are two "axes of movement," one rotational and one shifting, relative to central axis 31a. Thus, the tool shown has four axes of movement, that is, up-down movement of the barrel, rotation of the barrel, extension and retraction of the barrel, and tilt of the shovel. Ordinarily, a trunnion mounted to the crawler portion of a shovel will be rotatable to provide for a motion called "swing," but this control is customarily provided separately and controlled by a handle manipulated by the left hand. It forms no part of this invention. It will therefore be seen that the shovel on the end of the boom can be knuckled under, can be extended and retracted, lifted and lowered, and turned. It is the purpose of this control to provide the operator with means for controlling motion on these four axes which will enable him to regard his control handle as analogous to the shovel itself, such that movement of his hand will be translated by him mentally into direct control movement of the shovel itself. Thus, the operation of the shovel becomes a simple, straight-forward matter, and does not require long and rigorous training as is now required for devices of a similar type where a separate control handle is required for the operation of the control for each axis.

A seat 50 is provided for the operator next to a pillar 50a. The pillar mounts a control arm 51 adjacent to the seat, in a position so that the operator's right arm can rest atop it. The control arm includes an arm rest portion 52 and a grip portion 53. The arm rest portion is swively mounted to the pillar by a flange 54, so that the arm can raise and lower in angular elevation as shown by arrows 55 (see FIG. 2).

The grip portion is mounted by a knuckle 56 so as to be movable in a tilt direction shown by arrows 57. The knucle is at the end of a rotatable shaft 58 that is journaled in the arm rest portion, so that the grip portion also has a rocking movement shown by arrows 59.

The flange is pinned to a shaft 60, and the shaft is mounted to a carriage 61 (see FIG. 3) by bearing 62. This carriage is mounted in dovetailed ways 63 in the structure of the pillar, giving flange 60, and therefore the entire arm, the ability to move forward and back in the direction shown by arrows 64.

Movement of the control arm in the direction shown by the various arrows is intended to be directly related to the movement which it will cause in the boom and in the shovel. The control arm comprises a triggered pneumatic assembly which governs the flow of hydraulic fluid to the respective motors. For this purpose, control elements 65, 66, 67, 68 are provided.

Control element 65 is directly coupled to grip portion 53 and provides control of fluid flow to conduits 32a and 32b to control tilt movement caused by motor 32 in the direction shown by arrows 57.

Control element 66 controls the supply of hydraulic fluid through conduits 29a and 29b to motor 29 for controlling the rocking movement in the direction indicated by arrows 59. It is directly coupled to rotatable shaft 58 to respond to "wagging" movement of the grip portion.

Control element 67 (see FIGS. 1 and 3) controls the supply of fluid to motor 26 through conduits 26a and 26b for controlling boom extension movement along the direction indicated by arrows 64. It is directly coupled to the carriage to respond to forward and backward movement of it.

Element 68 is directly coupled to flange shaft 60 to control the supply of fluid through conduits 24a and 24b to motor 24 for controlling the elevation movement as shown by elevation arrows 55.

Each of the control elements includes a yoke shown in various of the drawings, together with a hydraulic-pneumatic system shown in FIG. 6 and the term "control element" includes both the physically movable yoke assembly and the hydraulic-pneumatic circuitry. The yoke constructions will first be described.

FIG. 5 shows a yoke assembly 70 which forms part of control element 66. It is mounted to rotatable shaft 58. A bleed valve housing 71 is mounted to the arm rest portion beneath shaft 58. This housing is fixed relative to the arm rest portion. A yoke 72 is keyed to the shaft so as to rotate therewith in the direction shown by rock arrows 59. The yoke has a pair of arms 73, 74 which straddle housing 71. Each arm bears a set of five trip members 75–79, and 80–84, respectively. The trip members are so disposed and arranged that they will make respective contact with valve members 85–89 and 90–94, respectively, in that sequential order as the yokes are swung one way or the other. Thus, as the yoke is swung counter-clockwise in FIG. 5, valve members 85–89 will be contacted sequentially in that order by trip members 75–79, while when the yoke is swung clockwise, valve members 90–94 will be struck sequentially in that order by trip members 80–84. It will be observed that the reversal of these parts could have been provided for as well, that is, the yoke could have been made stationary relative to the arm rest portion, and the bleed valve housing could have been made titable with the shaft to make the contact between the trip members and the valve members.

It will be seen that the trip members and valve members will be contacted sequentially on one side or the other of the bleed valve housing as the yoke is pivoted, and that there will be angular positions of the yoke relative to the bleed valve housing at which only some of the trip members will be contacted, and that there is also a neutral position (shown in solid line) at which none of them is contacted. The broken line illustrates the condition when all valve members 90–94 are contacted.

Bleed valve housing 71 is shown in full detail in FIG. 6. One of these housings is provided in all of the control elements, as the pneumatic and hydraulic circuitry associated with it. Before discussing the construction and operation of the pneumatic-hydraulic circuitry, the remaining yoke assemblies will be disclosed.

A yoke assembly 99 similar to yoke assembly 70 is provided in the grip portion, wherein a yoke 100 is pinned to the pivotable segment of the grip portion, and a bleed valve housing 101 is keyed to the end of rotatable shaft 58, so that knuckling movement of the grip portion will tilt the yoke and cause engagement between the trip member and the valve members carried by bleed valve housing 101, the same as in yoke assembly 70. Yoke assembly 99 forms a portion of control element 65.

Now with reference to FIG. 3, there are shown yoke assemblies 110 and 111. Yoke assembly 110 forms a portion of control element 67, and yoke assembly 111 forms a portion of control element 68. Yoke assembly 110 differs somewhat from the previously described yoke assemblies, and is shown in detail in FIG. 4. Instead of the yoke assembly or its associated bleed valve housing's being relatively pivotable, they are relatively slidable.

In FIG. 3, the carriage and ways can be seen, and flange shaft 60 is shown in FIG. 4 between arms of a fork 112 which is a part of bleed valve housing 113 in yoke assembly 110. The fork thereby causes the bleed valve housing to move axially with shaft 60 as it is moved forward and back by movement of the control arm. The bleed valve housing is maintained vertically by means of a pair of guides 114, 115 which slide along tongues 116, 117, respectively, to the pillar. Bleed valve housing 113 has ten valve members identical with those of bleed valve housing 71, and its pneumatic circuitry is identical.

A yoke 118 is fixed to the pillar and provides a pair of upstanding arms 119, 120, to each of which are mounted in axial alignment with respective valve members, trip members 121–125 on the left-hand side and 126–130 on the right-hand side. These trip members may conveniently comprise set screws which may be set so as to sequentially contact the respective valve members when the bleed valve housing is moved toward them. Thus, yoke 118 is completely the equivalent of yoke 72, except that the sequential contact between the tip members and the valve members is caused by relative axial movement between the bleed valve housing and the yoke, rather than by relative pivotal movement.

Yoke assembly 111 has a bleed valve housing 132 identical to bleed valve housing 131, adapted to be moved axially by shaft 60, and held aligned by tongues and guides. It has a yoke 131a identical to yoke 72 of FIG. 5, pinned to shaft 60. The trip members and valve members of yoke assembly 111 are identical to those of yoke assembly 70.

As is evident from the drawings, it is the purpose of each of the control elements to control the flow of hydraulic fluid to and from the respective hydraulic motors. This is done by pneumatic pilot systems, one of which is provided in each of the control elements. An exemplary one is shown in FIG. 6, and for convenience, being described with reference to control element 66. For convenience in disclosure, yoke 72 is not shown in FIG. 6, but bleed valve housing 71 will be recognized together with its valve members. As can be seen in FIG. 6, these valve members are ordinary check valves shown for convience as ball checks in orifices so that the valve members comprise a ball check orifice, the ball being spring-loaded outwardly to a closed position. Valve members 85 and 90 are directional control orifices and are connected respectively to conduits 135, 136.

Valve members 86–89 and 91–94 are velocity-control orifices and are connected in pairs. Valve members 87 and 92 are connected to conduit 138. Valve members 89 and 94 are connected to conduit 140. The pneumatic connections from the respective bleed valve housings are not shown in detail in the structural drawings for purposes of simplicity in disclosure. However, the yoke assemblies are connected to the valving of their respective control elements so that the entire control element governs flow of hydraulic fluid to and from the respective motors.

A pilot pressure supply line 141 is connected to the actuators of pilot actuators 142, 143, 144, and 145 of velocity pilot valves 146, 147, 148, 149, respectively. Orifices 150, 151, 152, 153 are placed into respective branch lines to actuators 142–145. Valves 146–149 are shown in their actuated high pressure condition, and the solid line in the valving portion of each of these valves indicates the pressure condition which pertains at that time. If the pressure drops below the value required to keep the valve in its actuated condition, then the pressure connection through the switching portion of the valve would be that shown by the dotted lines in the respective valve. The solid and dotted lines thus indicate alternate connections, the solid line indicating the condition pertaining when the actuator is set as shown. The connection shown schematically by line 154 is an atmospheric vent, and is typical of such vents in others of the illustrated valves.

Each velocity pilot valve has a pair of ports capable of being selectively connected to a common port. One of the ports is a vent and the other of the selectable ports of each of these valves is connected to an actuating pressure supply line 155. It will thereby be seen that when velocity pilot valves 146–149 have sufficiently high pressure in their respective actuators, their common ports (common port 154a is an example of a "common port," which is one which can be connected to either of the two selectable ports) are vented, and that when the pressure falls in the actuator, their common ports are respectively connected to the actuating pressure supply line.

Common ports of velocity pilot valves 146–149 are respectively connected to actuators 156, 157, 158, 159 of hydraulic control valves 160, 161, 162, 163. The valves as illustrated are closed against flow when their respective actuators are vented to atmosphere. The respective actuators are supplied with pressure when their respective pilot valves are switched over, and they are then connected to the actuating pressure supply line. At that time, the respective hydraulic control valves are switched over to open and provide for hydraulic flow therethrough. It will thereby be seen that the velocity pilot valves and the hydraulic control valves in the following pairs comprise a single pilot-actuated hydraulic control valve assembly: valves 146, 160; 147, 161; 148, 162; and 149, 163. It is preferable to keep pilot functions and high pressure actuating functions separate which is the reason for using pilot valves, but one valve could be used instead of two, by using pilot pressure to actuate the hydraulic control valve segments. Hydraulic control valves 160–163 have first ports 164, 165, 166, 167, respectively, all of which are connected to an exhaust line 168. The hydraulic control valve's condition has second ports 169, 170, 171, 172, which are respectively connectible to the first ports, and which include respective orifices 173, 174, 174, 176, all joined to an exhaust manifold 177. Another orifice 178 shunts across the other orifices between exhaust line 168 and exhaust manifold 177.

Direction selector pilot valves 179, 180 respectively have actuators 181, 182, both of which are connected to pilot pressure supply line 141 and the branches through which actuators pass through orifices 183, 184, respectively. Conduits 135, 136 also connect to actuators 181 and 182, respectively, while conduits 137–140 respectively connect to actuators 142–145. It will be observed that when the various valve members in the bleed valve housing are closed, the pressure in the various actuators can build up to the maximum pressure supplied in the pilot pressure supply line 141, but that when the respective valve member to which conduits 135–140 are open to atmosphere, the pressure in the respective actuator will drop and the respective valve can switch over to its other switching condition. The purpose of orifices 150–153, 183 and 184 is to isolate the pressure drop to the actuators as they are affected by unseating of the respective valve members, so that all actuators are not dropped in pressure merely because a single one of the valve members is unseated.

The direction selector pilot valves are shown in their actuated condition with their common ports connected to their vents. Their other selective ports are connected to actuating pressure supply line 155. The common ports 185, 186 of direction selector pilot valves 179, 180 are respectively connected by conduits 187, 188 to opposite ends of a shuttle 189, and to manifolds 190, 191. The shuttle has a center port 192 connected by a conduit 193 to the actuator 194 of a pump unloading valve 194a. Shuttle 189 has the property of connecting its common port to that one of conduits 187 or 188 which has the higher pressure and shutting the other one off.

Manifold 190 is connected to actuators 195, 196 of direction selector valves 197, 198, respectively. Manifold 191 is connected to actuators 199, 200 of direction selector valves 201, 202, respectively. The direction selector valves are shown with their actuators unactuated by pressure and with the switching portion of the valve closed to fluid flow. This is the position which would pertain when no motor movement is desired. Actuation of the respective actuators would open the respective valves to fluid flow.

A reservoir 205 furnishes a supply of hydraulic fluid for the system. It will be recognized that a single reservoir could be used for more than one of the control elements, but that individual hydraulic systems could be provided, if desired. A pump 206 withdraws liquid from the reservoir and pressurizes it, applying it to a pressure conduit 207. A relief valve 208 is set at the desired system pressure and is connected between the pressure conduit 207 and exhaust conduit 209 which returns to reservoir. The pressure conduit is connected to first port 210 of pump unloading valve 195 and the second port 221 is connected to exhaust conduit 209. Pump unloading valve 194a operates directly the opposite from valve 197, for example, in that when its actuator 194 is unactuated as shown, its ports 210 and 211 are interconnected as shown (indicating a valve open to flow) permitting a direct unloading of the pump from pressure conduit to exhaust conduit, thereby relieving the pump from the task of pumping the fluid through the relief valve when the system is unactuated. This greatly reduces heating up of hydraulic fluid which occurs when the fluid is pumped continuously through a relief valve, and further reduces energy requirements for operating the system.

First ports 212 and 213 of valves 197 and 201 are connected to pressure conduit 207. Second port 214 of valve 197 is connected to conduit 29a, as is first port 215 of valve 202. The first port 216 of valve 198 and the second port 217 of valve 201 are connected to conduit 29b. Motor 29 will be recognized from FIG. 1, and it will be understood that with respect to every motor controlled by one of these control elements, the conduits 29a and 29b together with their motor 29 would be directly substituted for by the respective motors and conduits of the other motors under the control of the respective elements in a control element as described. Thus, the control element shown in FIG. 6 is exemplary of a control element suitable for each axis of movement and one will be provided for each motor. A person skilled in the art will immediately recognize that an economy in reservoirs, pumps, and relief valves can be attained, and that each control element could have, but need not have, its own separate reservoir, pump, and relief valve. It will also be recognized that valve 194a can be dispensed with, together with shuttle 189, leaving conduits 187 and 188 isolated from each other should the provision for unloading the pump, when hydraulic pressure is not needed for operating the motor, not be desired. Should a single hydraulic pressure unit be used, then a single unloading valve would be used, which would, of course, be under control of connections through the shuttles of every control element, so that the fluid will not be dumped when some control elements are idle and others actuated by their respective yoke assemblies.

Second ports 218, 219 of valves 198 and 202 are both connected to exhaust line 168.

The operation of the above device will now be described. First, the operation of control element 65 controlling the "twist" or "rock" movement of shovel 33 will be described, it being assumed that the boom will not be tilted or extended, nor the shovel moved around its knuckle. The operator places his arm on the arm rest, and does not move it forward, backward, nor tilt the grip portion. Instead, he grasps the grip portion and pivots it around the axis of shaft 58. The result of this is the initial contact between one or the other of valve members 85 or 90 (FIG. 6). It will be observed that these two valve members are not fluidly connected to each other. Instead, each is connected to a respective one of conduits 135 and 136. Assume for a moment that valve member 85 is first to be contacted. This would correspond to a counter-clockwise movement of yoke 72. It will further be observed from the geometry of FIG. 2 that this valve member will be unseated before successive valve members 86–89 are unseated. This will permit air to bleed out past the ball and will drop the air pressure in actuator 181, orifice 183 serving to prevent a general drop of pressure in pilot pressure supply line 141. This switches over the switching condition of direction selector pilot valve 179, causing this valve to interconnect common port 185 with actuating pressure supply line 155, thereby putting pressure on in conduit 187. This pressure through shuttle 189 applies pressure to conduit 193 and actuator 194, thereby closing pump unloading valve 194a, to shut off flow therethrough, so that the pressure in pressure conduit 207 is regulated by the relief valve. It will be observed now that conduit 187 is under pressure and that conduit 188 is vented to atmosphere, whereas before both were vented to atmosphere.

Pressure in conduit 187 changes the switching condition of direction selector valves 197 and 198 and opens them to flow. Direction selector valves 201, 202 remain closed to flow. This results in flow from pressure conduit 207 through direction selector valve 197 to conduit 29a, operating the motor in one direction. The particular direction will be that which will rotate the boom to duplicate the rotation of the grip portion. Valves 201 and 202 are closed to flow. Exhaust fluid from conduit 29b flows through direction selector valve 198 and out into exhaust line 168, and through orifice 178 to exhaust manifold 177 and back to reservoir. Orifice 178 acts as a preliminary velocity control for the motor as it is a direct restriction on the rate at which fluid can be exhausted from the motor.

The device at this time is operating in a selected direction and at its lowest velocity. Had the other direction and lowest velocity been desired, the grip would have been tilted the other way so as to dump pressure in conduit 136, thereby arranging to put pressure on in conduit 188 and venting conduit 187, reversing the connections in valves 197, 198, 201, and 202, in which case the pressure from pressure conduit 207 would have passed through direction selector valve 201 to conduit 29b, running the motor in the opposite direction, and exhaust fluid would have passed from conduit 29a through direction selector valve 202 and thence into exhaust line 168, through orifice 178 to exhaust manifold 177. Thus the appropriate setting of pilot valves 179 and 180 arrange for the appropriate directional control of the motor and its basic velocity.

In the event that higher velocity is desired, it is attained by additional rotation of the grip portion. Assuming that valve member 85 was first to be contacted, then valve member 86 would have been next. It will further be observed that the remaining valve members are connected in pairs because direction control has already been attained by valve members 85 and 90, and velocity control will be the same for both directions. At any rate, when valve member 86 or 91 is contacted, pressure is dumped from conduit 137, thereby lowering pressure in actuator 142, causing velocity pilot valve 146 to switch over so that instead of venting actuator 156 of hydraulic control valve 160, it connects the common port of valve 146 to actuating pressure supply line 155, thereby actuating actuator 156 and switching over valve 160 so as to pass fluid from exhaust line 168 through the valve from its first port 164 to its second port 169 through orifice 173 and thus to exhaust manifold 177. This places a second exhaust path in parallel connection with orifice 178 and, of course, permits the motor to operate at a faster rate.

Similar reactions are obtained as valve members 87, 88, and 89 are contacted which operate on velocity pilot valves 147, 148, 149, the same as valve member 86 did on valve 146 to open valves 161, 162, 163 to fluid flow, thereby placing three more circuits in parallel with orifice 178 through orifices 174, 175, 176. Thus, this system has five basic speeds: that slow speed which is obtained when the direction is selected and wherein exhaust can pass only through orifice 178; and the successively higher speeds as additional exhaust fluid paths are provided through orifices 173–176.

It will now be appreciated how a control element of this type is inserted into the device of FIG. 1 for each of the systems. The operation of the device to twist the shovel has just been described. When it is desired to extend or retract the boom, the arm rest portion is moved forward or back so that the trip members on yoke 118 sequentially contact the valve members of bleed valve housing 113, thereby selecting the direction and velocity. The other two controls, that is, for elevating the barrel as controlled by control element 68, operates the same as that just described for the tilting element for the shovel, under control of yoke assembly 111. The tile of the shovel is controlled by control element 67 through circuitry connected to yoke assembly 99. The control elements may, of course, operate simultaneously or one at a time, depending on the will of the operator, and it will now be seen how the operator is able to envision his arm as equivalent to the shovel 33 such that the movements of this hand and arm are analogous to the movements of the shovel. This device thus combines into one simple hand-and-arm operated device enough control functions to fully govern the movement of a shovel in space. It will additionally be understood that more or fewer axes of movement can be controlled by multiplying or eliminating control elements according to the invention.

This invention is not to be limited by the embodiment shown in the drawings and described in the description which is given by way of illustration and not of limitation, but only in accordance with the scope of the appended claims.

I claim:

1. A control element for selecting the direction and speed of operation of a motor, comprising: a bleed valve housing having two opposite sides, each of said sides bearing a plurality of valve members, all of said valve members comprising bleed valves; a yoke comprising a pair of arms, an arm being disposed opposite each of said sides, a plurality of trip members on each arm, each being adapted to trip a respective valve member to open it to bleed into the atmosphere, the yoke and bleed valve housing being relatively movable and so disposed and arranged that there is a relative position where no trip member trips any valve member, and so that, as the yoke and bleed valve housing are moved in either direction, one or the other of the yoke arms approaches the bleed valve housing and the trip members on the approaching arm sequentially trip valve members on the side of the bleed valve housing which faces the approaching arm; a pair of direction selector valves adapted to be connected to said motor for transmission of fluid under pressure to run the same, said direction selector valves being operatively interconnected with respective ones of the first valve members to be tripped, said tripping providing means for causing appropriate connections to be made to the motor to cause it to operate in a selected direction; and at least one velocity control valve connected to a pair of other of said valve members, one valve member of said pair being disposed on each of said sides of said bleed valve housing, the members of said pair being contacted by respective trip members later than said first-named valve members, said velocity control valve being adapted to establish the rate of fluid flow through a motor.

2. In combination with a source of pressurized hydraulic fluid, and a fluid motor adapted to be operated by the same, said motor having a pair of ports adapted to receive pressure at a selected one of the ports and exhaust fluid at the other of its ports, a control element for selecting the direction and speed of operation of said motor, comprising: a bleed valve housing having two opposite sides, each of said sides bearing a plurality of valve members, all of said valve members comprising bleed valves; a yoke comprising a pair of arms, an arm being disposed opposite each of said sides, a plurality of trip members on each arm, each being adapted to trip a respective valve member to open it to bleed into the atmosphere, the yoke and bleed valve housing being relatively movable and so disposed and arranged that there is a relative position where no trip member trips any valve member, and so that, as the yoke and bleed valve housing are moved in either direction, one or the other of the yoke arms approaches the bleed valve housing and the trip members on the approaching arms sequentially trip valve members on the side of the bleed valve housing which faces the approaching arm; a pair of direction selector valves adapted to be connected to said motor for transmission of fluid under pressure to run the same, said direction selector valves being operatively interconnected with respective ones of the first valve members to be tripped, said tripping providing means for causing appropriate connections to be made to the motor to cause it to operate in a selected direction; and at least one velocity control valve connected to a pair of other of said valve members, one valve member of said pair being disposed on each of said sides of said bleed valve housing, the members of said pair being contacted by respective trip members later than said first-named valve members, said velocity control valve being adapted to establish the rate of fluid flow through a motor.

3. A combination according to claim 2 in which a pump supplies the hydraulic fluid under pressure to a supply line connected to said direction selector valves, and in which a pump unloading valve comprising an off-on valve is connected between said supply line and a reservoir from which the fluid is withdrawn by the pump, and means interconnected with the direction selector means for causing said pump unloading valve to open to fluid flow and discharge fluid directly from the pump to the reservoir when the trip members do not unseat any of said valve members.

4. In combination, a source of hydraulic fluid under pressure, a motor having a pair of ports, four direction selector valves, each of said valves comprising an off-on valve and an actuator for governing the same, a first and a third of said direction selector valves being connected to the source of hydraulic fluid under pressure, and to opposite ones of the ports of the motor, the second and fourth of the direction selector valves being connected to an exhaust conduit and to opposite ports of the motor, the first and second of said direction selector valves being connected to opposite motor ports from each other, and the third and fourth being connected to opposite ports from each other, a pair of direction selector pilot valves comprising a pair of selector valves having a vent condition and a condition in which they are connected to a source of fluid under pressure, the actuators of the first and second direction selector valves being connected to a first of said direction selector pilot valves, and the actuators of the third and fourth direction selector valves being connected to the second of said direction selector pilot valves, an actuator for each of said direction selector pilot valves, a source of compressed fluid connected to each of said actuators, an orifice in the connection to each of said actuators, a bleed valve housing having two opposite sides, each of said sides bearing a plurality of valve members, all of said valve members comprising bleed valves; a yoke comprising a pair of arms, an arm being disposed opposite each of said sides, a plurality of trip members on each arm, each being adapted to trip a respective valve member to open it to bleed into the atmosphere, the yoke and bleed valve housing being relatively movable and so disposed and arranged that there is a relative position where no trip member trips any valve member, and so that, as the yoke and bleed valve housing are moved in either direction, one or the other of the yoke arms approaches the bleed valve housing and the trip members on the approaching arm sequentially trip valve members on the side of the bleed valve housing which faces the approaching arm; a pair of direction selector valves adapted to be connected to said motor for transmission of fluid under pressure to run the same, said direction selector valves being operatively interconnected with respective ones of the first valve members to be tripped, said tripping providing means for causing appropriate connections to be made to the motor to cause it to operate in a selected direction; and at least one velocity control valve connected to a pair of other of said valve members, one valve member of said pair being disposed on each of said sides of said bleed valve housing, the members of said pair being contacted by respective trip members later than said first-named valve members, said velocity control valve being adapted to establish the rate of fluid flow through a motor, the actuators of the direction selector pilot valves being connected to individual ones of the first-named valve members.

5. A combination according to claim 4 in which a shuttle interconnects the actuators of the first and second direction selector valves, and with an actuator in a pump unloading valve, said pump unloading valve comprising an off-on valve connected between the hydraulic fluid supply line and an exhaust line, the actuator of the pump unloading valve being connected to the shuttle and being so disposed and arranged that the pump unloading valve is open to fluid flow when no pressure is supplied to its actuator as a result of no trip members being in contact with any valve member in the bleed valve housing.

6. In combination: a shovel boom including a knuckled under shovel, said combined shovel and boom having freedom of movement along a plurality of axes; a plurality of motors connected to said shovel and boom combination, there being one motor for each of said axes, each of said motors being a fluid operated motor having a pair of ports adapted to receive and discharge fluid for operating the same; an individual control element for each of said motors comprising a source of hydraulic fluid under pressure, four direction selector valves, each of said valves comprising an off-on valve and an actuator for governing the same, a first and a third of said direction selector valves being connected to the source of hydraulic fluid under pressure, and to opposite ones of the ports of the respective motor, the second and fourth of the direction selector valves being connected to an exhaust conduit and to opposite ports of the respective motor, the first and second of said direction selector valves being connected to opposite motor ports from each other, and the third and fourth being connected to opposite ports from each other, a pair of direction selector pilot valves comprising a pair of selector valves having a vent condition and a condition in which they are connected to a source of fluid under pressure, the actuators of the first and second direction selector valves being connected to a first of said direction selector valves, and the actuators of the third and fourth direction selector valves being connected to the second of said direction selector pilot valves, an actuator for each of said direction selector pilot valves, a source of compressed fluid connected to each of said actuators, an orifice in the connection to each of said actuators, a bleed valve housing having two opposite sides, each of said sides bearing a plurality of valve members, all of said valve members comprising bleed valves; a yoke comprising a pair of arms, an arm being disposed opposite each of said sides, a plurality of trip members on each arm, each being adapted to trip a respective valve member to open it to bleed into the atmosphere, the yoke and bleed valve housing being relatively movable and so disposed and arranged that there is a relative position where no trip member trips any valve member, and so that, as the yoke and bleed valve housing are moved in either direction, one or the other of the yoke arms approaches the bleed valve housing and the trip members on the approaching arm sequentially trip valve members on the side of the bleed valve housing which faces the approaching arm; a pair of direction selector valves adapted to be connected to said motor for transmission of fluid under pressure to run the same, said direction selector valves being operatively interconnected with respective ones of the first valve members to be tripped, said tripping providing means for causing appropriate connections to be made to the motor to cause it to operate in a selected direction; and at least one velocity control valve connected to a pair of other of said valve members, one valve member of said pair being disposed on each of said sides of said bleed valve housing, the members of said pair being contacted by respective trip members later than said first-named valve members, said velocity control valve being adapted to establish the rate of fluid flow through a motor, the actuators of the direction selector pilot valves being connected to individual ones of the first-named valve members; and a control for regulating the application of power to said motors, the control being adapted to fit an operator's hand and arm so that the hand and arm simulate a driving connection with the body, comprising: ways, and a carriage engaged to said ways, said carriage being adapted to move forward and back on said ways and providing for a first axis of control; an arm rest portion rotatably mounted to said carriage, the rotational movement of said arm rest portion providing for a second axis of control; a rotary shaft journaled to the arm rest portion for movement therewith, the rotation of the shaft providing for a third axis of control; a grip portion mounted to the rotary shaft for forward and back movement with the arm rest portion of the rotary shaft, the grip portion being adapted for rotation relative to the rotary shaft and providing for a fourth axis of control, whereby the operator's arm may be rested on the arm rest portion and the grip portion grasped with his hand, in order to move the arm rest and grip portion on their respective axes; and respective control elements for each of said movements which are actuated by respective movements of said portions for regulating application of power to respective ones of said motors in accordance with the position of the said portions; the said control assembly being fitted to said control to provide relative movement between the respective yokes and bleed valve housings in response to movements of the control.

7. A control for regulating the application of power to a plurality of motors in order to control the speed and direction of movement of a body in space on a plurality of axes of movement by appropriate regulation of said motors, the control being adapted to fit an operator's hand and arm so that the hand and arm simulate a driving connection with the body, comprising: ways, and a carriage engaged to said ways, said carriage being adapted to move forward and backward on said ways and providing for a first axis of control; an arm rest portion rotatably mounted to said carriage, the rotational movement of said arm rest portion providing for a second axis of control; a rotary shaft journaled to the arm rest portion for movement therewith, the rotation of the shaft providing for a third axis of control; a grip portion mounted to the rotary shaft for forward and backward movement with the arm rest portion of the rotary shaft, the grip portion being adapted for rotation relative to the rotary shaft and providing for a fourth axis of control, whereby the operator's arm may be rested on the arm rest portion, and the grip portion grasped with his hand, in order to move the arm rest and grip portion on their respective axes; and respective control elements for each of said movements which are actuated by respective movements of said portions for regulating application of power to respective ones of said motors in accordance with the position of these said portions, each of said control elements comprising a yoke assembly comprising a bleed valve housing and a yoke having a pair of arms, the arms being disposed on opposite sides of the respective bleed valve housings from each other, said arms and bleed valve housings being relatively movable upon movement of the respective portions, whereby contact between the respective arms and bleed valve housings provides for control of a respective motor.

8. A control for regulating the application of power to a plurality of motors in order to control the speed and direction of movement of a body in space on a plurality of axes of movement by appropriate regulation of said motors, the control being adapted to fit an operator's hand and arm so that the hand and arm simulate a driving connection with the body, comprising: ways, and a carriage engaged to said ways, said carriage being adapted to move forward and backward on said ways and providing for a first axis of control; an arm rest portion rotatably mounted to said carriage, the rotational movement of said arm rest portion providing for a second axis of control; a rotary shaft journaled to the arm rest portion for movement therewith, the rotation of the shaft providing for a third axis of control; a grip portion mounted to the rotary shaft for forward and backward movement with the arm rest portion of the rotary shaft, the grip portion being adapted for rotation relative to the rotary shaft and providing for a fourth axis of control, whereby the operator's arm may be rested on the arm rest portion and the grip portion grasped with his hand, in order to move the arm rest and grip portion on their respective axes; and respective control elements for each of said movements which are actuated by respective movements of said portions for regulating application of power to respective ones of said motors in accordance with the position of these said portions, each of said control elements comprising a bleed valve housing and a yoke having a pair of arms, the arms being disposed on opposite sides of the respective bleed valve housings from each other, movement of the respective portion causing relative movement between the respective arms and bleed valve housings; each bleed valve housing including a plurality of valve members, and each of said arms including a plurality of trip members, there being a plurality of said trip members on each arm and a plurality of valve members on each of the sides of said bleed valve housing that faces toward the said arms, said trip members being so disposed and arranged as to sequentially contract the valve members as the portion moves the respective arm, said valve members comprising fluid bleed means, contact between the trip member and its respective valve member permitting fluid under pressure to be bled from said control element controlled by pressure under control of said valve means for controlling the flow of hydraulic fluid to respective ones of said motors.

References Cited in the file of this patent
UNITED STATES PATENTS

| | | |
|---|---|---|
| 1,880,138 | Hubl | Sept. 27, 1932 |
| 2,822,094 | Greer | Feb. 4, 1958 |
| 2,858,947 | Chapman | Nov. 4, 1958 |
| 2,861,699 | Youmans | Nov. 25, 1958 |